United States Patent [19]

Powers

[11] Patent Number: 5,330,382
[45] Date of Patent: Jul. 19, 1994

[54] SIZER ADAPTER APPARATUS AND METHOD FOR CREATING SUBSTANTIALLY EVENLY AND INCOMPLETELY FILLED CASINGS

[75] Inventor: Richard G. Powers, Overland Park, Kans.

[73] Assignee: Marlen Research Corporation, Overland Park, Kans.

[21] Appl. No.: 956,604

[22] Filed: Oct. 5, 1992

[51] Int. Cl.⁵ .............................................. A22C 11/00
[52] U.S. Cl. ......................................... 452/37; 452/45
[58] Field of Search ....................... 452/37, 35, 30, 38, 452/45, 46, 48

[56] References Cited

U.S. PATENT DOCUMENTS

| | | | |
|---|---|---|---|
| 2,070,850 | 2/1937 | Trabold | 452/30 |
| 4,434,528 | 3/1984 | Niedecker | 452/37 |
| 4,766,645 | 8/1988 | Lamartino et al. | 452/37 |
| 4,847,951 | 7/1989 | Kollross | 452/45 |
| 5,145,450 | 9/1992 | Staudenrausch et al. | 452/30 |

FOREIGN PATENT DOCUMENTS 1925733 11/1970 Fed. Rep. of Germany ........ 452/45

Primary Examiner—Willis Little
Attorney, Agent, or Firm—Hovey, Williams, Timmons & Collins

[57] ABSTRACT

Sizing apparatus (10) for handling and casing of a flowable material such as meat is provided in order to produce individual, loose-filled casings (98) having product evenly distributed along the lengths thereof. The apparatus (10) preferably includes an elongated, tubular horn (16) having a discharge end (20) and adapted to receive a length of casing material (21) thereover. A tunnel device (14) having an inlet end (32) is situated closely adjacent the discharge end (20) and is oriented to receive the forward ends (96) of partially filled casings (98), in order to evenly distribute the meat as the casings (98) are formed. Separable voider jaws (24, 26) and a clipper (28) are employed for clipping the ends of the casings (98). The tunnel device (14) preferably includes rollers (40, 64) at the inlet end (32) thereof, with pickup conveyor assemblies (50, 70) downstream of the rollers (40, 64) which receive and continue the conveyance of the casings (98) through and out of device (14).

21 Claims, 2 Drawing Sheets

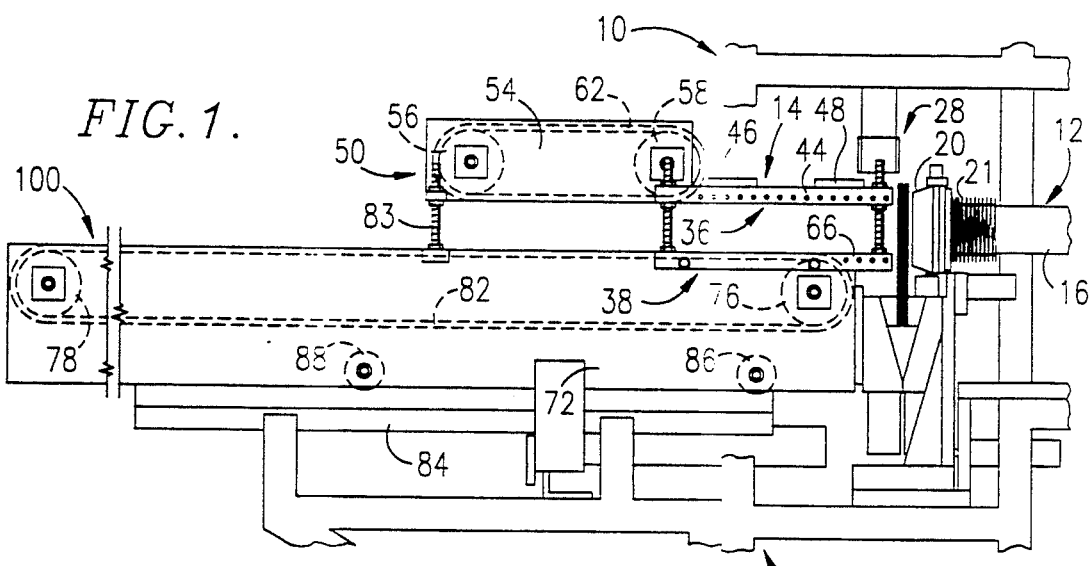
FIG. 1.
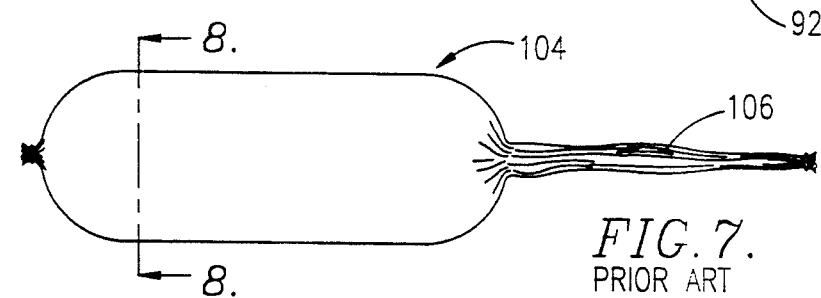
FIG. 7. PRIOR ART
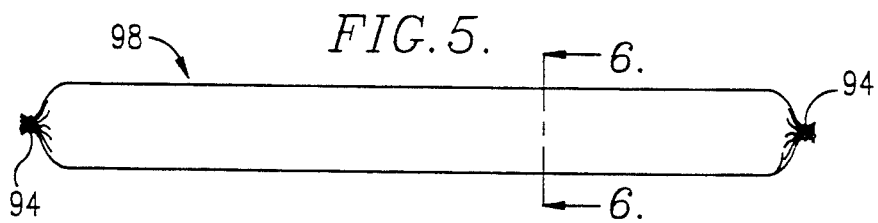
FIG. 5.
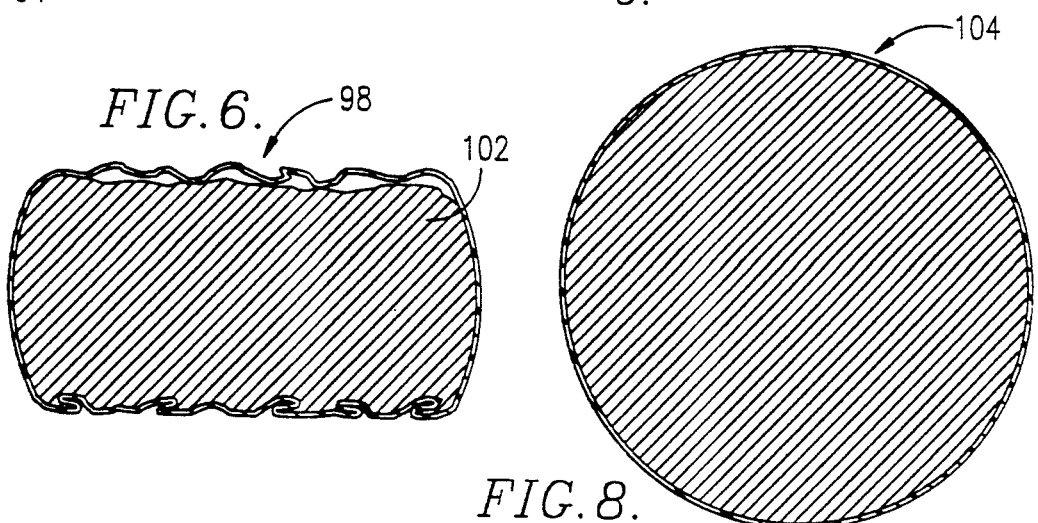
FIG. 6.
FIG. 8. PRIOR ART

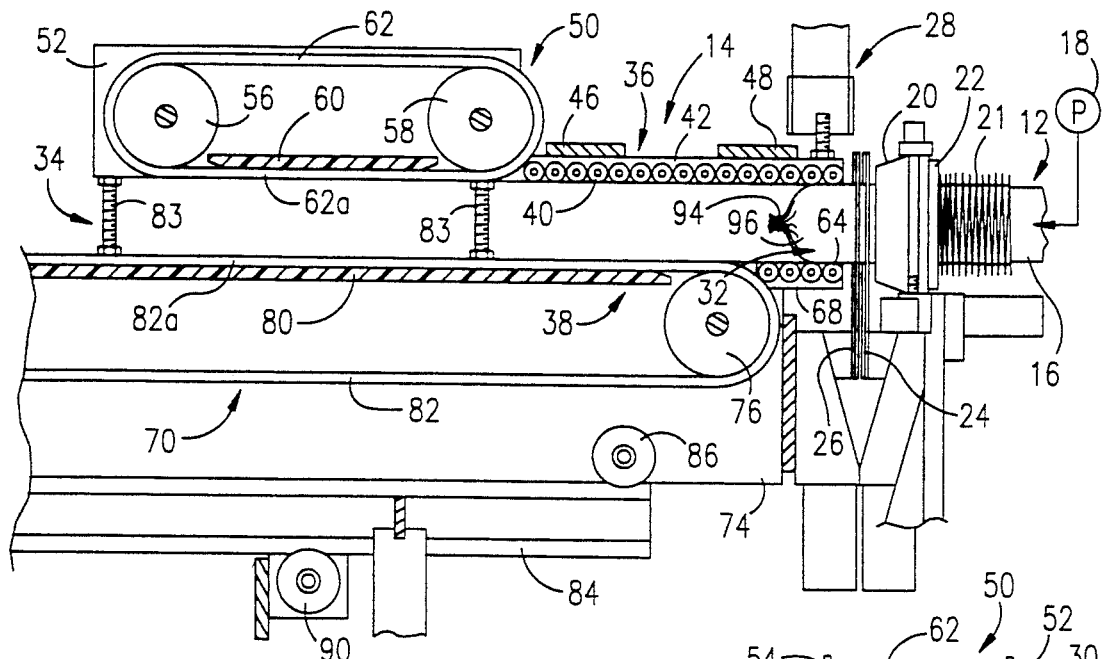
FIG.2.
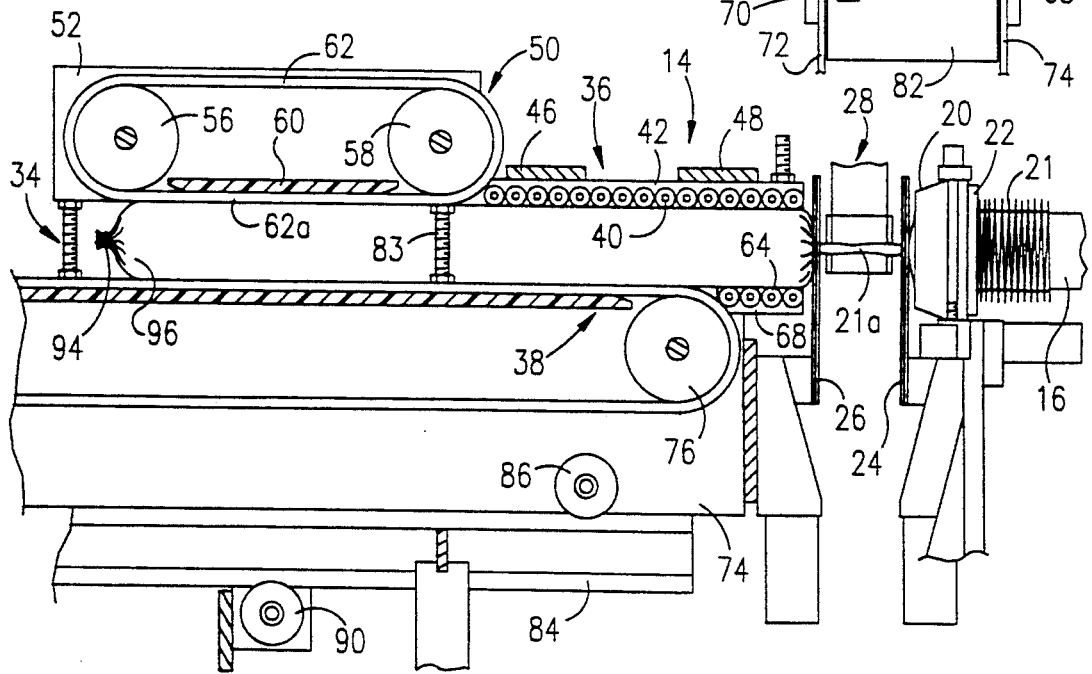
FIG.4.
FIG.3.

SIZER ADAPTER APPARATUS AND METHOD FOR CREATING SUBSTANTIALLY EVENLY AND INCOMPLETELY FILLED CASINGS

BACKGROUND OF THE INVENTION

1. Field of the Invention

The present invention is broadly concerned with improved sizing apparatus of the type used for packaging of flowable materials such as meat into accurately sized, individually encased portions. More particularly, the invention pertains to a sizing apparatus which produces encased portions wherein the casings are incompletely or "loose" filled, while at the same time ensuring that the meat or other flowable material is substantially evenly spread throughout the length of the loosely filled casing. Such evenly distributed, loose-filled casings are used in the production of meat products having non-circular cross-sections, e.g., sausages or luncheon meats of oval or square cross-section.

2. Description of the Prior Art

Many products such as sausages, luncheon meats, hamburger or other comminuted materials are packaged in elongated casings. For example, casing material may be stuffed with a luncheon meat emulsion, which is thereafter cooked, removed from the casing and sliced. Commercial sizing devices have been proposed in the past for high-speed stuffing of casing material and termination of the casing ends, typically through the use of mechanically set clips. For example, U.S. Pat. No. 5,104,348 describes a very successful sizer apparatus designed for this purpose. Generally speaking, sizers include an elongated, tubular stuffing horn having a rearward end adapted for coupling to a meat pump, with an opposed forward end adapted to receive casing material, either as individually applied casings or in elongated, shirred form from which multiple casing sections can be successively drawn. A clipping device is situated adjacent the discharge end of the horn for clipping the casing material and completing the casings as they are formed. In practice, meat is delivered via the pump into the horn and out the discharge end thereof, thereby pulling casing material off of the horn as the meat emerges. As each discrete portion of meat is delivered and encased, the clipping device is operated to clip the terminal ends of the casings.

If the desired end product from a given sizing operation is to have a circular cross-section, the sizing devices of the prior art are completely suitable. That is, the casings are substantially filled throughout the lengths thereof and assume a maximum expanded diameter in excess of the internal diameter of the sizer horn. The only real consideration in such cases is to ensure that the sizer creates accurate portion weights, package-to-package.

On the other hand, many producers desire to make end products having square, oval or some other non-circular cross-sections. In these instances, conventional practice has been to create packages wherein the casing sections employed are loose-filled, i.e., the volume of meat in each section is less than the internal volume of the unexpanded casing section. Such loose-filled casings can then be placed in an appropriate mold or other support having the desired final configuration, whereupon the meat may be cooked to assume this desired shape.

The practice of creating loose-filled casings creates a significant problem in its own right. Specifically, as the meat product emerges from the horn, there is a tendency for the meat to fill and expand the adjacent, forwardmost section of the casing to its fullest extent, leaving a completely unfilled "tail" of casing downstream of the filled casing section. It is then necessary to grasp and manipulate each of these packages individually, and manually knead and shift the meat product within the casing so as to more or less evenly distribute the meat throughout the length of the casing. This hand labor is relatively time consuming and arduous, and represents a real bottleneck in an otherwise highly automated packaging line.

Accordingly, there is a real and unsatisfied need in the art for an improved sizer apparatus and method which is capable of producing loose or incompletely filled casings having the product therein substantially evenly distributed along the lengths of the casings, while eliminating the need for extensive handling and manipulation of the casings.

SUMMARY OF THE INVENTION

The present invention overcomes the problems outlined above and provides an improved sizing apparatus for handling flowable materials and discharging the same in discrete portions encased within respective, incompletely filled casings. Broadly speaking, the sizer apparatus of the invention includes an elongated, tubular horn presenting an internal diameter, a rearward material input end, and a forward discharge end for receiving single or shirred casings thereover. A pump is operably coupled with the horn input end for delivery of successive discrete portions of meat or the like to and out the discharge end of the horn. The sizer apparatus further includes means for substantially evenly spreading the flowable material within each casing while preventing complete filling of a casing section and leaving other sections thereof substantially unfilled.

The preferred material-spreading means includes an elongated tunnel structure presenting an inlet end and an outlet end and comprising a pair of elongated, spaced apart, opposed, casing-conveying members. This tunnel structure is mounted closely adjacent the discharge end of the horn for receiving a casing section having flowable material therein as the casing is discharged from the horn, in order to spread the material along the length of the casing. Very importantly, the distance between the opposed tunnel-defining members is less than the maximum potential expanded diameter of the casing, so that the casing is never permitted to expand by virtue of internal filling to this point. By the same token, the lengths of the opposed tunnel-defining members should be substantially greater than the distance therebetween, and sufficient for spreading the flowable material evenly throughout the length of the casing during processing.

In preferred forms of the invention, the inlet end of the tunnel-defining structure is spaced from the discharge end of the horn a distance which is less than the internal diameter of the horn. Moreover, the length of the opposed, casing-conveying members of the tunnel structure should be at least substantially equal to the lengths of the casing sections (i.e., the lengths of the shirred casing employed for each discrete package) being used, and the longitudinal axis of the tunnel-defining structure is in substantial alignment with the longitudinal axis of the stuffing horn.

Particularly good results have been achieved through the use of a pair of upper and lower roller segments at the inlet end of the tunnel structure. These roller segments can conveniently be located in close proximity to the discharge end of the horn. If desired, endless conveyor belts may be used downstream of the inlet roller segments, to facilitate movement of the casings through the tunnel structure.

In the use of the sizing apparatus of the invention, loose-filled casings having substantially even material distribution along the lengths thereof can be produced at high speed and with the complete elimination of manipulation of the casings apart from normal handling and conveying thereof.

BRIEF DESCRIPTION OF THE DRAWINGS

FIG. 1 is a fragmentary side elevational view illustrating the preferred sizing apparatus of the invention having the tunnel-type adaptor situated closely adjacent the discharge end of the sizing horn;

FIG. 2 is a fragmentary view in partial vertical section of the discharge horn/tunnel device, illustrated during initial stages of formation of a loose-filled casing;

FIG. 3 is a view similar to that of FIG. 2, but showing a loose-filled casing in substantially complete form and during the clipping operation;

FIG. 4 is a front view of the tunnel-type adaptor device of the invention;

FIG. 5 is a side elevational view of a completed, clipped, loose-filled casing in accordance with the invention;

FIG. 6 is a vertical sectional view taken along line 6—6 of FIG. 5;

FIG. 7 is a side elevational view of a prior art filled casing wherein the forward section of the casing is filled and expanded to a diameter in excess of that of the stuffing horn, with an unfilled "tail" section downstream of the forward, filled casing section; and FIG. 8 is a vertical sectional view taken along line 8—8 of FIG. 7.

DETAILED DESCRIPTION OF THE PREFERRED EMBODIMENTS

Turning now to the drawings, and particularly FIGS. 1-3, a sizing apparatus 10 is illustrated. Broadly speaking, the apparatus 10 includes a sizer assembly 12 as well as a closely adjacent, tunnel-type device 14 designed to substantially evenly spread material along the length of a loose-filled casing as the latter emerges from the assembly 12.

In more detail, the sizer assembly 12 is advantageously of the type described in U.S. Pat. No. 5,104,348, which is incorporated by reference herein. The assembly includes an elongated, tubular horn 16 having a rearward end adapted for coupling to a food pump 18 (see FIG. 2), as well as a forward discharge end 20. The pump 18 is most preferably a dual piston pump commercialized by Marlen Research Corporation of Overland Park, KS; pumps of this character are described in U.S. Pat. Nos. 4,097,962 and 4,700,899, both incorporated by reference herein. Of course, other types of conventional food pumps can also be employed, so long as they are capable of delivering discrete portions of material to the rearward end of horn 16 for passage therethrough out end 20.

An elongated, flexible and expandable casing 21 is positioned over end 20 of horn 16 as shown. As illustrated, the casing may be shirred and of a length sufficient for formation of a plurality of individual, completed casings. Alternately, appropriately sized casings may be individually applied over the horn 16 during operation. The overall sizing assembly 12 further includes a tubular casing brake mechanism 22 positioned adjacent end 20 on horn 16. The purpose of brake mechanism 22 is to smooth the passage of casing 21 as the latter is drawn off of the horn 16. Again, a number of known casing brakes can be used for this purpose, but that described in pending application for U.S. Ser. No. 07/873,377 filed Apr. 24, 1992 is particularly preferred; this application is likewise incorporated by reference herein.

The sizing assembly 12 also includes two pairs of laterally shiftable, selectively operable voider jaws 24, 26 mounted in close adjacency with discharge end 20 of horn 16. The voider jaws 24, 26 are designed when separated to pinch and draw a short, unfilled section of casing therebetween, and to permit lowering and operation of a conventional clipping device 28 (see FIG. 3). The latter serves to apply two spaced apart clips to the unfilled casing section, and to cut the section between the clips; this simultaneously forms the end clip of a completed casing and the forward clip of the next casing to be filled.

The device 14 includes an elongated, casing-engaging tunnel structure 30 presenting an inlet end 32, outlet end 34, and is defined by a pair of elongated, vertically spaced apart casing-conveying members 36 and 38. As shown, the upper casing-conveying member includes a plurality of horizontally oriented non-powered rollers 40 supported by elongated, side marginal frames 42, 44, the latter having a pair of cross braces 46, 48 in spanning relationship thereto. A short, powered conveyor assembly 50 is situated downstream of the upper rollers 40. The assembly 50 includes a pair of spaced apart side frames 52, 54 supporting rollers 56, 58 therebetween, as well as a synthetic resin belt support 60 between the rollers as shown. An endless belt 62 is trained around the rollers 56, 58, and presents a lower stretch 62a thereof in alignment with the upper rollers 40.

Lower casing-conveying member 38 also includes a plurality of lower non-powered rollers 64 mounted between short horizontal frame supports 66, 68. A relatively large conveying assembly 70 is located downstream of the rollers 64 as shown and includes a pair of laterally spaced apart sidewalls 72, 74 supporting a pair of rollers 76, 78 and an elongated, synthetic resin belt support 80 therebetween. An endless conveying belt 82 is trained around the rollers 76, 78 and presents an upper stretch 82a in alignment with lower rollers 64. A total of six upstanding, spaced apart threaded studs 83 and corresponding threaded connectors 83a serve to support the upper casing-conveying member 36 in an elevated, substantially parallel relationship with the lower conveying member 38. As illustrated, the studs 83 are operatively secured between the upper and lower side frames for the rollers 40 and 64, and between the side frames for the upper and lower conveying assemblies 50 and 70. This construction permits adjustment of the height of the upper casing-conveying member 36 relative to the lower casing-conveying member 38. Those skilled in the art will appreciate that other adjustable mounting devices could also be employed in order to permit selective height adjustment.

A stationary track assembly 84 is located directly beneath conveying assembly 70 and is cooperable with rollers 86, 88 and 90 for permitting selective lateral shifting of device 14 and voider jaws 26 relative to voider jaws 24 and sizing assembly 12. As best seen in FIG. 1, an underlying, upright, stationary frame assembly 92 supports track 84 (and thereby device 14), as well as sizing assembly 12.

The operation of sizing apparatus 10 will next be described. At the outset of operation, shirred casing 21 is placed over the discharge end 20 of horn 16. The horn is pivotal about an upright axis adjacent its rearward end to permit access to the discharge end 20 and placement of casing 21 thereover. During installation of the casing 21, the casing brake mechanism 22 is first removed, the casing 21 is slid over the tubular open end of horn 16, and the casing brake mechanism 22 is then replaced. The horn 16 is then pivoted back to the operative position thereof shown in FIGS. 1-3. A clip 94 is then applied to the outer end of the casing 21, and the voider jaws 24, 26 are opened to permit free passage of filled casing therethrough.

As those skilled in the art will appreciate, the casing 21 is of flexible, expandable nature, and typically a relatively long length (e.g., 250 ft.) of shirred casing is installed over the horn 16, so that a large number of casings may be produced without the need for reinstalling a fresh supply of casing material. Generally, the casing if completely filled may assume a maximum potential expanded diameter which is substantially greater than the internal diameter of the associated horn 16. Thus, a typical casing 21 used on a horn 16 having a 3" nominal internal diameter would normally have a maximum expansion to a diameter of approximately 6".

The pump 18 is next operated to deliver a discrete charge or portion of material such as meat into the rearward end of the horn and ultimately out discharge end 20 thereof. As this operation proceeds, the flowable product serves to draw casing off of horn 16 as the casing is being filled. However, by virtue of the fact that the inlet end 32 of device 14 is positioned in close adjacency to discharge end 20 of horn 16, the casing material is not permitted to expand to its maximum potential diameter. Rather, the forward end 96 (see FIG. 2) of the casing section being filled passes immediately between the inlet-defining rollers 40, 64 before maximum expansion can occur. As the discrete portion of meat is further discharged from horn 16 and into the casing section being formed, the rollers 40, 64 serve to engage the upper and lower surfaces of the casing in order to evenly distribute the meat along the length of the casing section. This action is continued as the casing encounters the endless conveyor belts 82 and 62 downstream of the respective roller segments, until the complete meat portion is encased within the casing section being formed, and the entire section is situated between the upper and lower members 36, 38. This condition is illustrated in FIG. 3.

In the next step, the voider jaws 24, 26 are closed to pinch the casing 21, and the entire device 14 together with jaws 26 is shifted leftwardly as viewed in FIGS. 2 and 3 for a short distance. This is accomplished via the track and roller mounting assembly 84-90 for the device 14. Such movement creates a gap between the voider jaws 24, 26, with a short, unfilled casing section 21a between jaw pairs. Clipper 28 is then operated in order to apply a pair of spaced apart clips 94 to the unfilled casing section 21a, and a knife mechanism (not shown) is used to sever the section 21a between the applied clips. At this point, the now completed, loose-filled casing 98 (see FIG. 5) is conveyed by lower conveyor belt 82 to the discharge end 100 of the sizing assembly 10 for transfer to the next processing section. The device 14 is also shifted rightwardly as viewed in FIGS. 1-3 until the voider jaws 24, 26 are opened and assume their adjacent position. The above operation can then be repeated in order to successively form completed casings 98.

Attention is directed to FIGS. 5 and 6 which illustrate a representative completed casing 98. As explained previously, the unexpanded volume of the external casing material is less than the volume of the discrete portion 102 of meat therein. As a consequence, the casing is loose or incompletely filled as best seen in FIG. 6.

In normal practice, the loose-filled casings 98 are next conveyed to a mold or other support where they may be finally shaped and cooked. Upon cooking, the meat product assumes the desired molded shape, and is ready for removal of the external casing and slicing.

It will be appreciated that the operation of sizing apparatus 10 creates completed casings 98 having a substantially even distribution of flowable meat product along the length thereof, without the necessity for significant manipulation of the casings to achieve this end. This is to be contrasted with conventional practice. As best seen in FIG. 7, loose-filled casings are typically produced using sizing apparatus by filling a forward section 104 of a length of casing material to an expanded condition, wherein the diameter of the section 104 is greater than the internal diameter of the associated horn. Thereafter, the voider jaws are separated a longer distance than required simply for the clipping operation in order to create an elongated, unfilled tail section 106 having a clip at the terminal end thereof. As best seen in FIG. 8, the forward section 104 is substantially circular in cross-section. In order to more or less evenly distribute the meat along the entire length of the casing, it is necessary to manually grasp the enlarged forward section 104 and work the meat rearwardly until the entire casing is filled. This is not only arduous, but often represents a significant production bottle-neck. Therefore, the device of the present invention, completely eliminating these intermediate steps, represents a very significant advantage to a processor.

It has been determined that placement of the tunnel device 14 relative to the discharge end 20 of horn 16 is of significant importance. Preferably, the longitudinal axis of the device 14 is aligned with that of the horn 16, and the lateral distance between the inlet end 32 of the device 14 and the discharge end of the horn is less than the internal diameter of the horn. Moreover, to assure the smoothest operation, the length of tunnel device 14 should be at least substantially equal to the length of the completed, encased packages being produced. Although use of relatively small diameter rollers at the inlet end of the device 14 is preferred, appropriately sized, powered conveyor belts could be used in lieu thereof.

I claim:

1. Sizing apparatus for handling flowable material and discharging the same as a discrete portion encased within an incompletely filled casing, said sizing apparatus comprising:

an elongated, tubular stuffing horn presenting an internal diameter, a rearward material input end, and a forward discharge end adapted for receiving a casing thereover permitting the casing to receive said flowable material;

a pump operably coupled with said horn input end for delivery of a discrete portion of said material to and out of said discharge end, said casing having an internal volume greater than the volume of a discrete portion of said material in order to accommodate said discrete portion while remaining incompletely filled, said casing having a maximum potential expanded diameter if completely filled with said material which is greater than said horn internal diameter; and means for substantially evenly spreading said discrete portion of said material within said casing receiving the same, and for preventing complete filling of a section of said casing while leaving other sections thereof substantially unfilled, said spreading means including:

tunnel-defining structure presenting an inlet end and an outlet end and comprising a pair of elongated spaced apart, opposed, casing-conveying members, said inlet end having an initial contact point where said casing first engages the inlet end after passage from said horn discharge end; and means mounting said tunnel-defining structure with the inlet end thereof closely adjacent the discharge end of said horn for receiving said casing having material therein as the casing is discharged from said horn, and for spreading said material along the entire length of the casing as the casing passes through the tunnel-defining structure, the distance between said discharge end of said horn and said initial contact point being less than said internal diameter of said horn, the distance between said casing-conveying members being less than the maximum potential expanded diameter of said casing, the length of said casing-conveying members being substantially greater than the distance therebetween and sufficient for spreading said material evenly throughout the length of said casing.

2. Apparatus as set forth in claim 1, the length of said casing-conveying members being at least substantially equal to the length of one of said encased, discrete portions.

3. Apparatus as set forth in claim 1, the casing-conveying members each including a plurality of adjacent rollers.

4. Apparatus as set forth in claim 1, the rollers defining the inlet end of said tunnel-defining structure.

5. Apparatus as set forth in claim 1, the casing-conveying members further including respective, endless conveying belts.

6. Apparatus as set forth in claim 1, the horn being adapted to receive a shirred casing thereover having a length sufficient for formation of a plurality of individual, incompletely filled casings, said apparatus including structure for clipping the opposed ends of each of said individual, incompletely filled casings to form individual, complete packages.

7. Apparatus as set forth in claim 1, the mounting means including structure for selectively varying the distance between said casing-conveying members.

8. Apparatus as set forth in claim 1, the tunnel-defining structure being mounted with the longitudinal axis thereof in substantial alignment with the longitudinal axis of said horn.

9. A device adapted for mounting adjacent the discharge end of a tubular material casing stuffing horn presenting an internal diameter for substantially evenly spreading a portion of material along the length of a casing applied over the horn, where the material portion has a volume less than the volume of the casing, whereby the casing is incompletely filled, said device comprising:

tunnel-defining structure presenting an inlet end and an outlet end and including a pair of elongated, spaced apart, opposed, casing-conveying members, said inlet end having an initial contact point where said casing first engages the inlet end after passage from said horn discharge end; and means mounting said tunnel-defining structure with the inlet end thereof closely adjacent said horn discharge end for receiving said casing having material therein as the casing is discharged from said horn, and for spreading said material along the entire length of the casing as the casing passes through the tunnel-defining structure, the distance between said discharge end of said horn and said initial contact point being less than said internal diameter of said horn, the length of said casing-defining members being substantially greater than the distance therebetween and sufficient for spreading said material evenly throughout the length of the casing.

10. The device as set forth in claim 9, the length of said casing-conveying members being at least substantially equal to the length of one of said encased, discrete portions.

11. The device as set forth in claim 9, the casing-conveying members each including a plurality of adjacent rollers.

12. The device as set forth in claim 11, the rollers defining the inlet end of said tunnel-defining structure.

13. The device as set forth in claim 11, the casing-conveying members further including respective, endless conveying belts.

14. The device as set forth in claim 9, the mounting means including structure for selectively varying the distance between said casing-conveying members.

15. The device as set forth in claim 9, the tunnel-defining structure being mounted with the longitudinal axis thereof in substantial alignment with the longitudinal axis of said horn.

16. A method for substantially evenly spreading a discrete portion of material throughout substantially the entire length of an elongated casing where the casing has an internal volume greater than the volume of said discrete portion in order to accommodate the latter while remaining incompletely filled, said method comprising the steps of:

placing said casing over the discharge end of a tubular stuffing horn having an internal diameter;

passing said discrete portion through said horn and out the discharge end thereof, said material being received within said causing and serving to pull the casing off of said horn as it emerges from said discharge end; and directing said casing into and through a casing-engaging tunnel presenting an inlet end and a pair of spaced apart, opposed, casing-conveying member, said tunnel inlet being located closely adjacent the discharge end of said horn for spreading said material along the length of the casing during passage thereof through the tunnel, said inlet end having an initial contact point where said casing first engages the inlet end after passage from said horn discharge end, said directing step including the step of locating said inlet end such that the distance between said discharge end of said horn and said initial contact point is less than said internal diameter of said horn, said tunnel having a length substantially greater than the distance between said casing-conveying members.

17. The method of claim 16, said casing having a potential maximum expanded diameter if completely filled with material which is greater than said horn internal diameter, said casing being received within said tunnel inlet before said casing is filled to an extent to reach said potential maximum expanded diameter, said casing-conveying members being spaced apart a distance which is less than said potential maximum expanded diameter.

18. Sizing apparatus for handling flowable material and discharging the same as a discrete portion encased within an incompletely filled casing, said sizing apparatus comprising:

an elongated, tubular stuffing horn presenting an internal diameter, a rearward material input end, and a forward discharge end adapted for receiving a casing thereover permitting the casing to receive said flowable material;

a pump operably coupled with said horn input end for delivery of a discrete portion of said material to and out of said discharge end, said casing having an internal volume greater than the volume of a discrete portion of said material in order to accommodate said discrete portion while remaining incompletely filled, said casing having a maximum potential expanded diameter if completely filled with said material which is greater than said horn internal diameter; and means for substantially evenly spreading said discrete portion of said material within said casing receiving the same, and for preventing complete filling of a section of said casing while leaving other sections thereof substantially unfilled, said spreading means including:

tunnel-defining structure presenting an inlet end and an outlet end and comprising a pair of elongated spaced apart, opposed, casing-conveying members, each of said casing-conveying members including a plurality of adjacent rollers; and means mounting said tunnel-defining structure with the inlet end thereof closely adjacent the discharge end of said horn for receiving said casing having material therein as the casing is discharged from said horn, and for spreading said material along the entire length of the casing as the casing passes through the tunnel-defining structure, the distance between said casing-conveying members being less than the maximum potential expanded diameter of said casing, the length of said casing-conveying members being substantially greater than the distance therebetween and sufficient for spreading said material evenly throughout the length of said casing.

19. Sizing apparatus for handling flowable material and discharging the same as a discrete portion encased within an incompletely filled casing, said sizing apparatus comprising:

an elongated, tubular stuffing horn presenting an internal diameter, a rearward material input end, and a forward discharge end adapted for receiving a casing thereover permitting the casing to receive said flowable material;

a pump operably coupled with said horn input end for delivery of a discrete portion of said material to and out of said discharge end, said casing having an internal volume greater than the volume of a discrete portion of said material in order to accommodate said discrete portion while remaining incompletely filled, said casing having a maximum potential expanded diameter if completely filled with said material which is greater than said horn internal diameter; and means for substantially evenly spreading said discrete portion of said material within said casing receiving the same, and for preventing complete filling of a section of said casing while leaving other sections thereof substantially unfilled, said spreading means including:

tunnel-defining structure presenting an inlet end and an outlet end and comprising a pair of elongated spaced apart, opposed, casing-conveying member; and means mounting said tunnel-defining structure with the inlet end thereof closely adjacent the discharge end of said horn for receiving said casing having material therein as the casing is discharged from said horn, and for spreading said material along the entire length of the casing as the casing passes through the tunnel-defining structure, said mounting means including structure for selectively varying the distance between said casing-conveying member, the distance between said casing-conveying members being less than the maximum potential expanded diameter of said casing, the length of said casing-conveying members being substantially greater than the distance therebetween and sufficient for spreading said material evenly throughout the length of said casing.

20. A device adapted for mounting adjacent the discharge end of a tubular material casing stuffing horn for substantially evenly spreading a portion of material along the length of a casing applied over the horn, where the material portion has a volume less than the volume of the casing, whereby the casing is incompletely filled, said device comprising:

tunnel-defining structure presenting an inlet end and an outlet end and including a pair of elongated, spaced apart, opposed, casing-conveying member, said casing-conveying members each including a plurality of adjacent rollers; and means mounting said tunnel-defining structure with the inlet end thereof closely adjacent said horn discharge end for receiving said casing having material therein as the casing is discharged from said horn, and for spreading said material along the entire length of the casing as the casing passes through the tunnel-defining structure, the length of said casing-defining members being substantially greater than the distance therebetween and sufficient for spreading said material evenly throughout the length of the casing.

21. A device adapted for mounting adjacent the discharge end of a tubular material casing stuffing horn for substantially evenly spreading a portion of material along the length of a casing applied over the horn, where the material portion has a volume less than the volume of the casing, whereby the casing is incompletely filled, said device comprising:

tunnel-defining structure presenting an inlet end and an outlet end and including a pair of elongated, spaced apart, opposed, casing-conveying members; and means mounting said tunnel-defining structure with the inlet end thereof closely adjacent said horn discharge end for receiving said casing having material therein as the casing is discharged from said horn, and for spreading said material along the entire length of the casing as the casing passes through the tunnel-defining structure, said mounting means including structure for selectively varying the distance between said casing-conveying members, the length of said casing-defining members being substantially greater than the distance therebetween and sufficient for spreading said material evenly throughout the length of the casing.

* * * * *